Nov. 23, 1965

M. STIMLER 3,219,947

D.C. SATURABLE MAGNETIC CORE POWER SUPPLY CONVERTER

Filed Nov. 19, 1962

INVENTOR
MORTON STIMLER

BY *Hodges*

ATTORNEY

Nov. 23, 1965    M. STIMLER    3,219,947
D.C. SATURABLE MAGNETIC CORE POWER SUPPLY CONVERTER
Filed Nov. 19, 1962    2 Sheets-Sheet 2
FIG.2a.    $I_1$
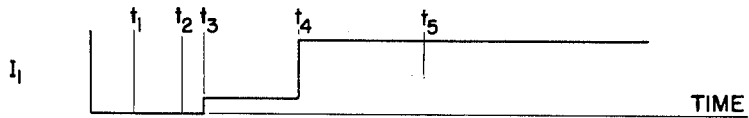
FIG.2b.    $e_g$
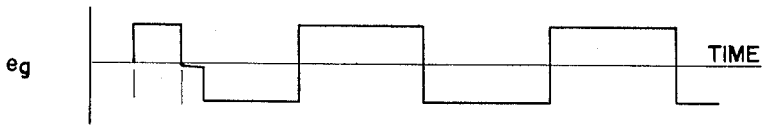
FIG.2c.    $I_2$
FIG.2d.    $I_s$
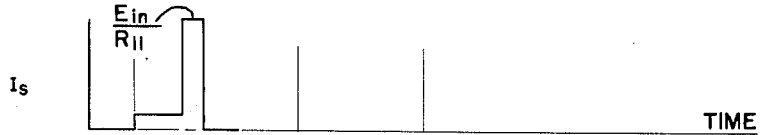
FIG.2e.
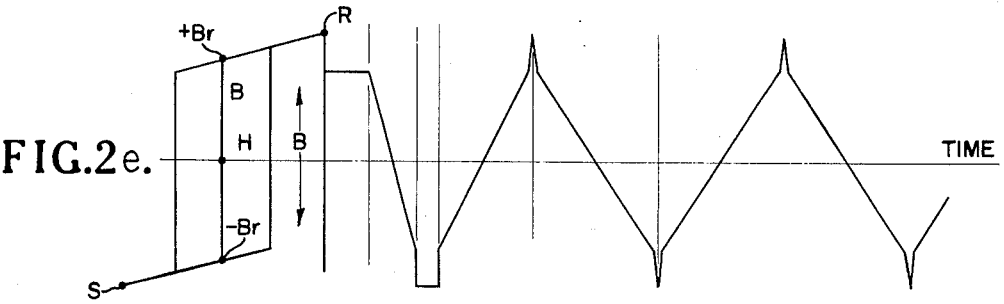
FIG.2f.    AMPERE TURNS
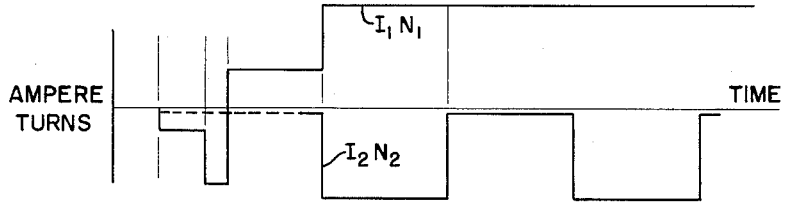
FIG.2g.    $E_o$
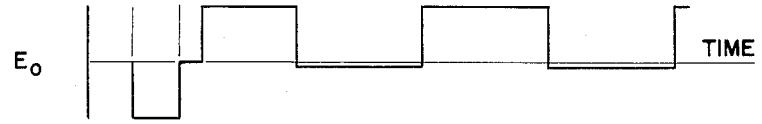
INVENTOR
MORTON STIMLER
BY    *D.E. Hodges*
ATTORNEY ![United States Patent Office] 3,219,947
Patented Nov. 23, 1965

3,219,947
D.C. SATURABLE MAGNETIC CORE POWER SUPPLY CONVERTER
Morton Stimler, Hyattsville, Md., assignor to the United States of America as represented by the Secretary of the Navy
Filed Nov. 19, 1962, Ser. No. 238,816
4 Claims. (Cl. 331—148)
(Granted under Title 35, U.S. Code (1952), sec. 266)

The invention described herein may be manufactured and used by or for the Government of the United States of America for governmental purposes without the payment of any royalties thereon or therefor.

The present invention relates to a D.C. to D.C. power supply converter and more specifically to a saturable transformer type power supply converter which is insensitive to nuclear radiation.

In the field of missile power supply conversion systems it has been the general practice to employ transistors as switching elements in combination with the saturable transformers. Although such devices have proven satisfactory insofar as transistor switching time is concerned, considerable difficulty has been experienced in certain missile applications wherein the operational characteristics of the semiconductor elements have been affected by nuclear radiation and high temperatures.

The difficulty here arises from the change in impurity concentration within the crystal structure of the semiconductor due to nuclear radiation and high temperatures, and this change is brought about by a breakdown within the crystal structure itself.

The present invention obviates the aforesaid disadvantages by employing a novel vacuum tube circuit in combination with a saturable transformer whereby magnetic switching is accomplished substantially independent of attendant nuclear radiation and high temperatures.

An object of the present invention is the provision of a novel D.C. to D.C. power supply converter circuit with operating characteristics substantially independent of nuclear radiation and high temperatures.

Another object is to provide a converter circuit of the type disclosed which is operable with conventional vacuum tubes to control the switching thereof.

A further object of the invention is the provision of magnetic switching in a D.C. to D.C. power supply converter utilizing vacuum tube means for controlling a small current through a relatively large number of reset windings wound on a saturable transformer.

Still another object is to eliminate the necessity of employing transistors to control magnetic switching in a low voltage to high voltage D.C. to D.C. converter circuit.

The novel direct current converter circuit employed in the present invention to carry out the above objects comprises a saturable transformer having a single output winding and a plurality of input windings wound on a magnetic core having a square loop magnetization curve. The input windings may include a start, a run, a bias, a reset and a discharge winding. The run winding is connected to a point of reference potential at one end thereof and the run and reset windings are connectable at a common connection via switch means to a D.C. voltage supply which has its negative terminal connected to a point of reference potential. A vacuum tube has an output electrode connecting another end of said reset winding. A bias winding is interposed between the vacuum tube control grid and a point of reference potential, and impedance means connect the input electrode of the vacuum tube to a point of reference potential. The run and reset windings are wound on the magnetic core so that current entering the common connection produces like-directed magnetic fluxes along their mutual flux paths. As the magnetic core saturates and causes a variation in magnetic flux in the input windings, a varying voltage induced in the bias winding alternately biases the vacuum tube into and out of conduction whereby an alternating output voltage is generated.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 2 illustrates current, voltage and flux wave forms in the various transformer windings of FIG. 1;

Figure 1:
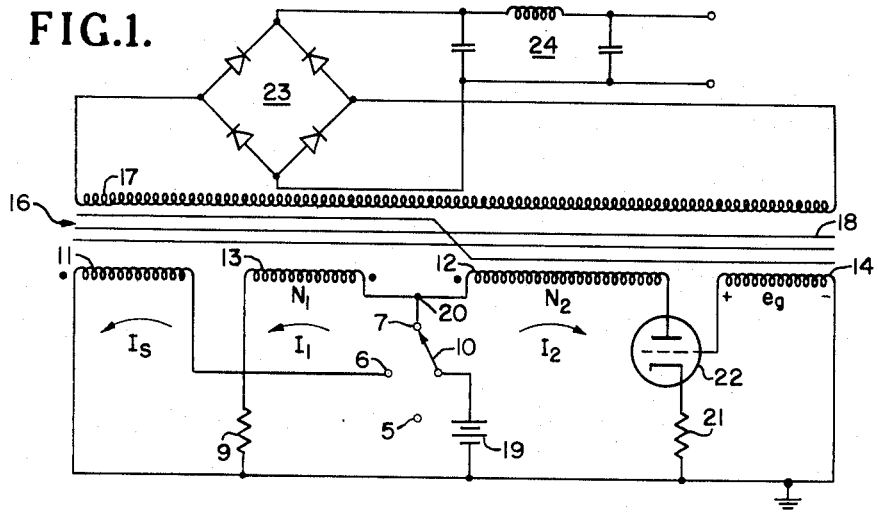
FIG. 1 is a schematic diagram of one embodiment of the circuit arrangement of the present invention.

The circuit of FIG. 1 comprises a transformer 16 with a single output winding 17 and four separate input windings 11, 12, 13 and 14 wound on a magnetic core 18 having a square loop magnetization curve illustrated in FIG. 2e of the drawing. A D.C. supply voltage 19 has its negative terminal connected to ground and its positive terminal selectively connectable via switch 10 to start winding 11 or run winding 13 and reset winding 12. The reset winding 12 consists of $N_2$ turns which are considerably greater in number than the number of turns $N_1$ on the run winding 13. The windings 12 and 13 are interconnected by tap 20 and the reset winding 12 is connected to bias winding 14 through vacuum tube 22 which may be a tetrode or a pentode rather than the triode shown in FIG. 1. Vacuum tube 22 has a current limiting resistor 21 in its cathode circuit with one end thereof grounded. Run winding 13 has its left hand terminal connected to ground through resistor 9. The start winding 11 may be replaced by a permanent magnet starting means for driving magnetic core 18 into the proper initial state of magnetization designated as point S in FIG. 2e. The output circuit may include any suitable means for rectifying and filtering the alternating voltage on output winding 17 such as the full wave diode bridge 23 in combination with filtering means 24 shown in FIG. 1.

*Operation*

Assuming the switch 10 is held in the off position 5 initially, then the core 18 may maintain any degree of magnetic flux saturation in either the positive or negative direction of FIG. 2e. When, however, switch 10 is advanced to the start position 6 illustrated as time $t_1$ in FIG. 2a, the magnetizing current $I_s$ will flow in start winding 11 thereby inducing a voltage $e_g$ (FIG. 2b) in bias winding 14 of FIG. 1 of the polarity shown. Assuming the core 18 was initially magnetized in the region of positive saturation in the vicinity of $+B_r$, the flux will be driven linearly to a point of negative saturation S as shown in FIG. 2e with the induced voltage $e_g$ being proportional to $$N\frac{d\phi}{dt}$$

where N is a constant and $\phi$ is the flux in core 18. The magnetizing directions of the start winding 11 and reset winding 12 are the same, and opposite to that of run winding 13 as indicated by the dot convention used in FIG. 1. These dots are so placed that when both exciting currents enter the dotted terminals (or both currents enter undotted terminals) these currents produce like directed magnetic fluxes along the common or mutual flux paths. The polarity assigned to $e_g$ in FIG. 1 is that of a voltage which is produced when switch 10 is moved from the off position to the start position shown at time $t_1$ in FIG. 2b, and no current will flow in the run or reset windings with switch 10 in the start position. When switch 10 is closed to energize coil 11 the magnetizing current $I_s$ will maintain $e_g$ in FIG. 2b constant so long as the flux rate of change in the core 18 is constant. At the point of core saturation S shown in FIG. 2e the current $I_s$ increases to a value of $E_{in}/R_{11}$ as shown at time $t_2$ in FIG. 2d where $E_{in}$ is the battery supply voltage 19 and $R_{11}$ is the resistance of winding 11.

When switch 10 is moved to the run position 7 at time $t_3$ in FIG. 2 there is an initial change of flux density from S to $-B_r$ shown in FIG. 2e due to the current flow of $I_1$ in the run winding 13. This change of flux density induces a voltage $e_g$ in bias winding 14 of opposite polarity to that shown in FIG. 1, and produces a negative bias on the grid of tube 22 rendering it nonconductive thus far. A magnetizing current $I_1$ flowing from supply voltage 19 through run coil 13 sets up a constant number of ampere turns $N_1$ as shown in FIG. 2f. During this period of constant current flow in coil 13, the flux in the core 18 will continuously change at a constant rate through the positive region toward R of FIG. 2e. Tube 22 will remain cut off since the induced voltage $e_g$ of FIG. 2b continues to bias the grid beyond the cut off and maintains current $I_2$ effectively zero.

When the core 18 goes into positive saturation as shown at time $t_4$ in FIG. 2e two things happen. The current $I_1$ rises to the maximum value $E_{in}/R_{13}$ where $R_{13}$ is the resistance of run winding 13 with a corresponding increase of ampere turns $N_1$ as shown in FIG. 2e due the drop in reluctance of the magnetic circuit at positive saturation. Secondly, with the no net rate of positive flux change, the induced voltage $e_g$ in bias winding 14 and appearing on the grid of triode 22 approaches zero allowing triode 22 to conduct. This conduction current $I_2$ passes through a large number of turns $N_2$ on the reset winding 12 causing the number of reset winding ampere turns $N_2I_2$ to exceed the number of run winding ampere turns $N_1I_1$ whereby $I_2R_{12}$ is greater than $I_1R_{13}$. Current flow $I_2$ now drives the flux in the core 18 toward the negative region of magnetization in FIG. 2e which induces a voltage $e_g$ in the bias winding 14 in the positive direction as illustrated in FIG. 1. The voltage appearing in the output winding 17 shown as $E_o$ in FIG. 2g will now be proportional to the vector sum of the ampere turns in windings 12 and 13 respectively once $I_2$ begins to flow in reset winding 12. The ampere turns are in phase opposition in FIG. 2f with tube 22 conducting and FIG. 2g illustrates the net output voltage shifted in phase 180° from $e_g$ of FIG. 2b due to transformer coupling.

The flux change in the negative region of FIG. 2e will continue until negative saturation is reached. At this time the induced voltage $e_g$ which has maintained triode 22 conducting is substantially reduced to a point where $I_1R_{13}$ is greater than $I_2R_{12}$. This occurs at S in FIG. 2e. The reduction of current $I_2$ in the reset winding 12 will once again allow the core flux to build up into the region of positive saturation and a cycle will repeat itself as long as switch 10 is in the run position 7.

Referring to FIG. 2g there will be a large voltage $E_o$ induced in the output winding 17 only during negative saturation. This occurs when $I_2R_{12}$ is less than $I_1R_{13}$. Winding 13 has a number of turns $N_1$ substantially less than the number of turns $N_o$ on the output winding, i.e. $N_1<<N_o$. The number of reset turns $N_2$ must be made large to maintain tube 22 current small relative to the D.C. value of battery current through the run winding 13 and a reversal of direction of the core flux takes place during the conduction of tube 22 where $I_2N_2>I_1N_2$. Consequently $N_2$ should be made greater or at least equal to the number of output turns $N_o$. In this manner the voltage induced in the output winding $E_o$ is small during negative going saturation as shown in FIG. 2g.

The output voltage $E_o$ may be rectified for example by a full-wave bridge network 23 and filtered to provide the desired D.C. output voltage.

Figure 3:
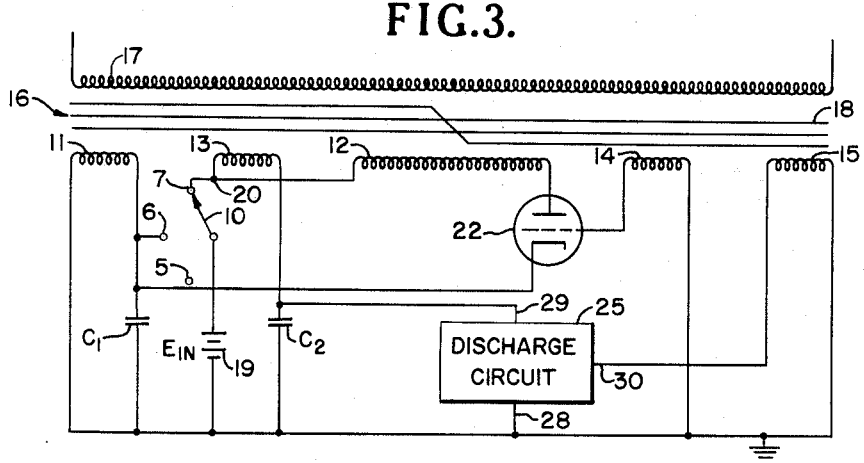
FIG. 3 is a modification of the embodiment disclosed in FIG. 1 providing therefor a novel charge and discharge circuit.

FIG. 3 shows a modified form of the invention wherein two capacitors $C_1$ and $C_2$ are connected between the right hand terminals of start winding 11 and run winding 13, respectively, and ground. A discharge circuit 25 has one terminal 28 grounded and terminals 29 and 30 interposed between capacitor $C_2$ and one end of a discharge winding 15. Winding 15 has been added to the transformer 16 and has its other end grounded.

A three-position switch 10 is employed as in FIG. 1 and when the supply voltage 19 is connected to position 6 of the switch, current flows through coil 11 and drives the core 18 to negative saturation at S and charges the 0.1 microfarad condenser $C_1$. If the switch 10 is moved to the run position 7, current flowing from battery 19 through coil 13 will drive the core 18 into positive saturation toward point R in FIG. 2e. Reset winding 12 which opposes run winding 13 is rendered nonconducting at this time for two reasons. Firstly, capacitor $C_1$ charges when the switch 10 is moved to the start position 6 to maintain vacuum tube 22 in the cut-off state. Secondly, and to a lesser degree, the bias coil 14 receives a negatively induced voltage as the core moves from S to R thereby further preventing the tube 22 from conducting. As the flux in the core 18 approaches the position R in FIG. 2e capacitor $C_1$ becomes substantially discharged at which time it serves as a cathode by-pass capacitor for tube 22 and the negatively induced voltage in coil 14 controls tube 22 and maintains it nonconducting. During this time capacitor $C_2$ charges and the battery current through coil 13 decreases. The values of capacitor $C_2$ and coil 13 are selected such that point R in FIG. 2e is reached in each cycle. With zero current flowing at this time a stable state of magnetization at $+B_r$ in FIG. 2e will be approached. Concurrently a positive bias voltage will be induced in coil 14 as shown in FIG. 1 due to a decrease in current in coil 13 which will cause tube 22 to conduct current through reset winding 12 and thus drive the core 18 to a point of negative magnetization S. At the same time a positive voltage is induced in discharge winding 15 of sufficient magnitude to actuate the discharge circuit 25 and prepare for the next cycle by discharging capacitor $C_2$ to its initial uncharged state.

Figure 4:
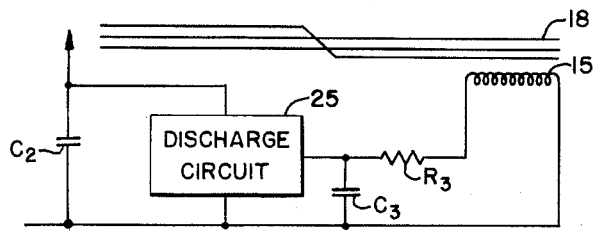
FIG. 4 is a further modification of FIG. 3 wherein a resistance-capacitance delay network is used in combination with the discharge circuit thereof.

The point S designating the maximum point of negative saturation to which the core 18 will be driven may be effected by a time delay network such as $R_3C_3$ shown in FIG. 4. The positively induced voltage in coil 15 charges capacitor $C_3$ at such a rate as to reach the discharge voltage of the discharge circuit 25 simultaneously with the core reaching point S. With capacitor $C_2$ discharged to determine the position of point S the current flowing in coil 13 increases and drives the core 18 in the direction of positive saturation. A negative voltage will be induced in coil 14 to cut off tube 22 and the current flowing in coil 13 will drive core 16 to the point of positive saturation R. The discharge circuit is de-activated during this part of the cycle and a high voltage is induced in secondary winding 17 which can be rectified to obtain high voltage D.C. output from a low voltage input source 19.

Obviously many modifications and variations of the present invention are possible in the light of the above teachings. It is therefore to be understood, that within the scope of the appended claims, the invention may be practiced otherwise than is specifically described.

What is claimed and desired to be secured by Letters Patent of the United States is:

1. A D.C. converter circuit comprising:

a saturable transformer having an output winding and a plurality of input windings wound on a magnetic core having a rectangular loop magnetization curve, said input windings comprising a start winding, a run winding, a reset winding, and a bias winding, said start winding having one end thereof connected to a point of reference potential, said run winding and said reset winding having a common connection therebetween, said run winding being connected at its other end via first impedance means to a point of reference potential, and said reset winding being connected at its other end to the plate of vacuum tube means;

said run and reset winding being wound on said core so that current entering said common connection produces like-directed magnetic fluxes along the mutual flux path of said run and reset winding;

said vacuum tube means further including a grid and a cathode, said bias winding interconnecting said grid and said point of reference potential, second impedance means interconnecting said cathode and said point of reference potential, a D.C. voltage supply means having a negative terminal connected to said point of reference potential and having a positive terminal selectively connectable via switch means to either the other end of said start winding or said common connection whereby a varying magnetic flux in said core induces a varying voltage in said bias winding to alternately vary the state of conduction of said vacuum tube.

2. The combination in claim 1 further comprising:

a discharge winding wound on said core, said discharge winding having one end thereof connected to said point of reference potential and the other end connected to one terminal of a discharge circuit; said discharge circuit further including a second terminal connected to said point of reference potential and a third terminal;

said second impedance means comprises a first condenser means interconnecting said other end of said start winding and said point of reference potential;

said first impedance means comprises a second condenser means having one side thereof connected to the junction of said other end of said run winding and said third terminal and the other side connected to said point of reference potential.

3. The combination in claim 2 further comprising:

a delay network interconnecting said discharge winding and said discharge circuit.

4. A D.C. converter circuit comprising a saturable transformer having an output winding and a plurality of input windings wound on a magnetic core having a square loop magnetization curve, said input winding comprising a run winding, a reset winding and a bias winding, said run and reset windings having a common connection therebetween and being wound on said core so that current entering said common connection produces like directed magnetic fluxes along the mutual flux path of said run and said reset windings;

vacuum tube means having a plate connected to one end of said reset winding and a grid connected to the other end of said bias winding;

said bias winding having its other end connected to a point of reference potential, said run winding having one end connected via a condenser to said point of reference potential and said vacuum tube having a cathode connected via a condenser to said point of reference potential;

a voltage supply means directly connectable between said reference potential and said common connection whereby the voltage induced in said bias winding due to a varying magnetic flux in said saturable transformer alternately biases said vacuum tube into and out of conduction;

a discharge winding wound on said magnetic cores;

said discharge winding having a discharge circuit means in parallel therewith which is operable upon receipt of a critical voltage induced in said discharge winding to discharge the one of said condensers interconnecting said run winding at said point of reference potential to thereby control the degree of magnetic core magnetization during each cycle of alternating voltage induced in said output winding.

References Cited by the Examiner
UNITED STATES PATENTS 2,838,669 6/1958 Horsch _____ 331—148
2,873,371 2/1959 Van Allen _____ 331—113

ROY LAKE, *Primary Examiner.*

JOHN KOMINSKI, *Examiner.*